United States Patent [19]

Arahara et al.

[11] Patent Number: 4,920,361

[45] Date of Patent: Apr. 24, 1990

[54] IMAGE RECORDING METHOD AND APPARATUS THEREFOR

[75] Inventors: Kohzoh Arahara; Hiroshi Fukumoto, both of Kawasaki; Toshiya Yuasa, Mitaka; Toshikazu Ohnishi, Atsugi; Fumitaka Kan, deceased, late of Tokyo, by Akiko Kan, legal successor; Hiroshi Tanioka; Norihiko Koizumi, both of Yokohama; Noboru Tohyama, Kawasaki, all of Japan

[73] Assignee: Canon Kabushiki Kaisha, Tokyo, Japan

[21] Appl. No.: 214,374

[22] Filed: Jun. 24, 1988

[30] Foreign Application Priority Data

Jun. 26, 1987 [JP] Japan ................................ 62-157574
Sep. 3, 1987 [JP] Japan ................................ 62-219087

[51] Int. Cl.[5] ....................... C01D 15/16; C09D 11/02

[52] U.S. Cl. ............................. 346/140 R; 346/76 R; 106/20; 101/450.1

[58] Field of Search ............ 346/140 R, 76 PH, 76 R, 346/1.1; 106/20, 22

[56] References Cited

U.S. PATENT DOCUMENTS 4,338,133 7/1982 Toyoda ................................ 106/22
4,352,691 10/1982 Owatari ................................ 106/20
4,530,961 7/1985 Nguyen ................................ 106/20

*Primary Examiner*—B. A. Reynolds
*Assistant Examiner*—Scott Rogers
*Attorney, Agent, or Firm*—Fitzpatrick, Cella, Harper & Scinto

[57] ABSTRACT

An image recording method and an image recording apparatus using an ink which is substantially non-adhesive but can be imparted with an adhesiveness when subjected to a pH change. In the image recording method, the ink is subjected to a pattern of pH change to be provided with an adhesive pattern, which is then transferred to a recording medium, such as plain paper, directly or by the medium of an intermediate transfer medium to form an ink pattern corresponding to the pH change pattern.

16 Claims, 7 Drawing Sheets

IMAGE RECORDING METHOD AND APPARATUS THEREFOR

FIELD OF THE INVENTION AND RELATED ART

The present invention relates to an image recording method which retain various advantages of the conventional recording systems and yet realizes a low recording cost, and an apparatus adapted thereto.

In recent years, along with the rapid progress of information industries, various data processing systems have been developed, and accordingly various recording methods and recording apparatus have been developed and adopted for the respective data processing systems. Among these, representative recording systems capable of recording on plain paper include electrophotography and laser beam printing system developed therefrom, ink jetting, thermal transfer, and impact printing system using a wire dot printer or daisywheel printer.

The impact printing system produces annoying noise and the application thereof to full- or multi-color recording is difficult. The electrophotography and the laser beam printing produce images at a high resolution, but the apparatus therefor are complicated and large in size thus requiring a large apparatus cost. The ink jet printing system requires only a small expendable cost but involves a process defect that, because a thin nozzle is used for jetting a low-viscosity liquid ink therefrom, the nozzle is liable to be clogged with the ink solidified during a period of non-use. Further, as the ink for the ink jet system is low-viscosity ink, the ink is liable to spread after it is deposited on paper, thus resulting in blurring of images.

Further, according to the thermal transfer method, wherein a heat pattern was supplied to a solid ink layer formed on a sheet form support to form a fused ink pattern, which is then transferred to plain paper, etc., to form an image thereon. The thermal transfer method has advantages that a relatively small apparatus is used and therefore only a small apparatus cost is required. However, an ink ribbon used in the thermal transfer method is composed by forming a solid ink layer on an expensive support and the ink ribbon is disposed after use, so that the thermal transfer method involves a disadvantage that it requires a high expendable cost.

In order to remove the above disadvantage of the thermal transfer method, our research group has proposed a novel recording method which has solved the above-mentioned problems and realized a low recording cost (Japanese Pat. Application No. 175191/1986, corresponding to U.S. patent application Ser. No. 075,045).

This recording method comprising:

providing a fluid ink which is capable of forming a fluid layer, substantially non-adhesive and capable of being imparted with an adhesiveness on application of an energy, forming a layer of the fluid ink on an ink-carrying member, applying a pattern of the energy corresponding to a given image signal to the ink layer to form an adhesive pattern of the ink, and transferring the adhesive pattern of the ink to a transfer-receiving medium to form thereon an ink pattern corresponding to the energy pattern applied.

Further, our research group has proposed, as an ink used for the above-mentioned image recording method, an image recording ink comprising: a liquid dispersion medium, and a crosslinked substance impregnated with the liquid dispersion medium; the ink being capable of being imparted with an adhesiveness on application of an electric current; the ink containing an electrolyte capable of imparting a pH buffer action thereto (U.S. patent application Ser. No. 156,978, now U.S. Pat. No. 4,838,940, corresponding to Japanese Pat. Application Nos. 36904/1987, 15241/1988, and 15242/1988).

SUMMARY OF THE INVENTION

A principal object of the present invention is to provide an image recording method and an image recording apparatus which have been improved upon the above-mentioned respective recording systems and have realized a recording at a low cost.

A more specific object of the present invention is to provide an image recording method and an image recording apparatus which can use up an ink therefor without disposal as far as the ink has not been actually used for recording or without using an ink ribbon or ink sheet to be disposed after use as in the conventional thermal transfer system.

As a result of our study, we have found gel ink which is unlike a solid ink used in a conventional thermal transfer recording method and the adhesiveness of which can be controlled patternwise when subjected to a patternwise change in pH value (i.e., hydrogen-ion concentration), or to a patternwise transfer of electrons. We have further found it possible to form an ink pattern corresponding to an image signal on a transfer-receiving medium by utilizing the selective or patternwise control of the adhesiveness of the ink surface and while providing almost the same degree of resolution as the thermal transfer process.

The recording method of the present invention is based on the above findings and comprises: providing an ink which is substantially non-adhesive and capable of being imparted with an adhesiveness when subjected to a pH change; causing a pattern of pH change corresponding to a given image signal on a layer of the ink formed on an ink-carrying member to form an adhesive pattern of the ink corresponding to the image signal, and transferring the adhesive pattern of the ink to a transfer-receiving medium to form thereon an ink pattern corresponding to the adhesive pattern.

Further, the recording apparatus of the present invention is one especially adapted for practicing the above-mentioned recording method, and comprises: an ink-carrying member moved along an ink contact position for carrying thereon a layer of an ink which is substantially non-adhesive but capable of being imparted with an adhesiveness when subjected to a pH change; a transfer-receiving medium moved along the ink contact position so as to contact the ink layer formed on the ink-carrying member at the ink contact position; and means for supplying a pH modifier to the ink layer is cause a pattern of pH change on the ink layer; whereby a part of the ink on the ink-carrying member imparted with an adhesiveness corresponding to the pattern of the pH change is selectively transferred to the transfer-receiving medium.

In the above-described image recording method according to the present invention, a selective adhesiveness is directly imparted to a layer of the ink formed on an ink-carrying member.

Because of the above feature, in the recording system (method and apparatus) of the present invention, an expensive ink ribbon or ink sheet which comprises a solid ink layer formed through complicated steps on an expensive support sheet and yet is to be disposed in the conventional thermal transfer process becomes unnecessary, whereby the expendable cost can be reduced remarkably.

These and other objects, features and advantages of the present invention will become more apparent upon a consideration of the following description of the preferred embodiments of the present invention taken in conjunction with the accompanying drawings, wherein like reference numerals denote like parts. In the following description, "%" and "part(s)" representing a quantitative proportion or ratio are by weight unless otherwise noted specifically.

DETAILED DESCRIPTION OF THE INVENTION

A fundamental structure of the recording apparatus according to the present invention will be explained with reference to FIG. 1 which is a schematic sectional view taken across the thickness of a transfer-receiving medium showing an embodiment of the recording apparatus.

Figure 1:
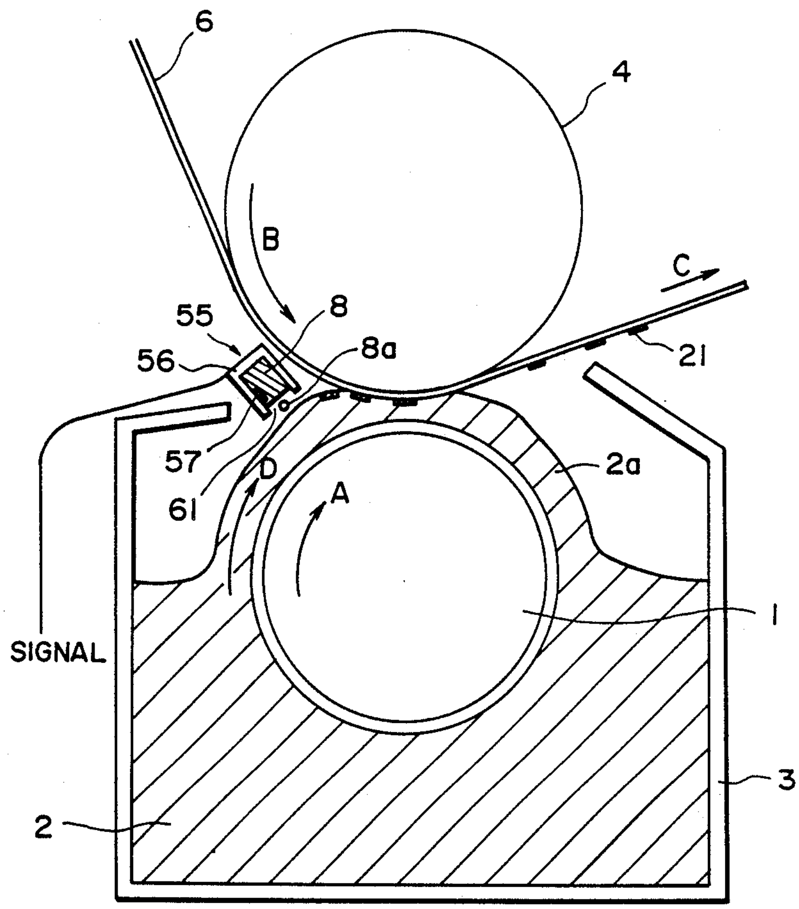
FIGS. 1–3, 5 and 6 are respectively a schematic sectional view or partial schematic sectional view of an apparatus for practicing the recording method of the present invention.

Referring to FIG. 1, an ink-carrying roller 1 having a surface of stainless steel, etc., within an ink container 3 for holding therein a fluid ink 2 so that it rotates in the direction of an arrow A while carrying the ink 2.

Above the ink-carrying roller 1 at an ink transfer position, a platen roller 4 having a surface of, e.g., silicon rubber is disposed opposite to the roller 1 with a certain gap therefrom so as to rotate in the direction of an arrow B. The platen roller 4 is disposed so that a transfer-receiving medium 6 contacting the roller 4 at the ink transfer position is moved in the direction of an arrow C while also contacting a layer *2a* of the fluid ink 2 formed on the ink-carrying roller 1. The transfer-receiving medium 6 may be composed of a plastic film, smooth paper having a Bekk smoothness of 300 sec or above, and coated so as not to be penetrable with the liquid dispersion medium in the ink 2, or a metal sheet, etc.

The cylindrical ink-carrying surface of the roller 1 may be composed of any material, as far as it is possible to form a desired layer of the fluid ink 2 when it is rotated in the arrow A direction. More specifically, the roller surface may be composed of a conductive material such as metal including stainless steel or an insulating material such as various resins.

The surface composed of such a material of the ink-carrying roller 1 can be smooth but may preferably be a roughened one to an appropriate extent (e.g., a roughness of the order of 1S) so as to enhance the conveying and carrying characteristics.

The thickness of the layer of the fluid ink 2 formed on the ink-carrying roller 1 can vary depending on various factors including the fluidity or viscosity of the fluid ink 2, the surface material and roughness thereof of the ink-carrying roller 1, and the rotational speed of the roller 1, but may preferably be generally 0.1–30 mm, further preferably about 0.1–10 mm, particularly preferably about 0.1–5 mm as measured at the ink transfer position where the roller 1 confronts the transfer-receiving medium 6.

If the layer thickness of the ink 2 is below 0.1 mm, it is difficult to form a uniform ink layer on the ink-carrying roller 1. On the other hand, if the ink layer thickness exceeds 30 mm, it becomes difficult to convey the ink 2 while keeping a uniform peripheral speed of the surface portion on the side contacting the transfer-receiving medium 6.

Figure 2:
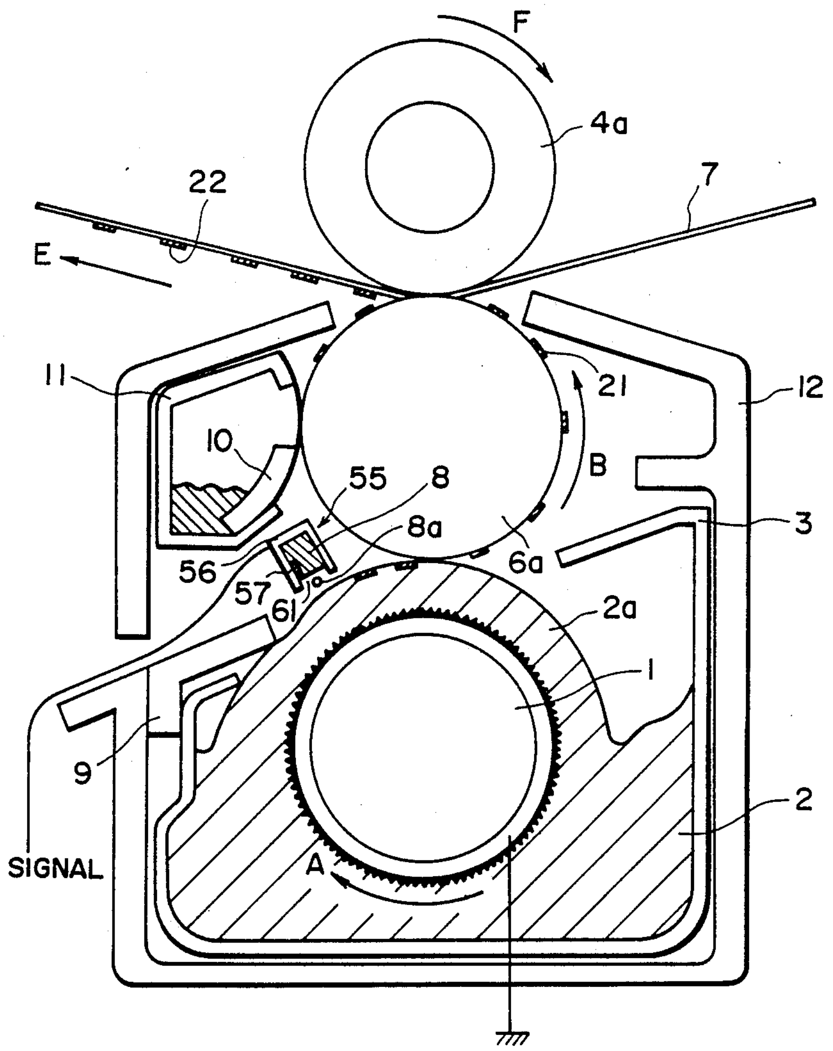

In order to more easily regulate the layer thickness of the fluid ink 2, it is possible as desired to dispose an ink layer thickness-regulation means such as a blade 9 as shown in FIG. 2 or to dispose an ink-application roller 13, respectively as described hereinafter.

Referring again to FIG. 1, above the ink-carrying roller 1 at a position upstream from the ink transfer position where the ink-carrying roller 1 and the platen roller 4 are disposed opposite to each other, a pH modifier-supplying means 55 for supplying a pH modifier to the ink layer *2a* corresponding to a given signal is disposed with a certain spacing from the surface of the roller 1. Herein, the pH modifier is a substance which is capable of causing a pH change on or in the ink 2 when it contacts the ink 2, such as an electron donor and an electron acceptor.

As the pH modifier-supplying means 55, e.g., there may preferably be used a device comprising a nozzle 56 and a heat-generating part (or element) 57 disposed in the nozzle 56, as shown in FIG. 1. In such case, when the heat-generating part 57 generates heat corresponding to image information, a liquid 8 disposed in the nozzle 56 bubbles and a liquid droplet *8a* is emitted from the nozzle 56.

The transfer-receiving medium 6 in the form of a sheet as shown in FIG. 1 can be a smooth coated paper having a Bekk's smoothness of 300 sec or above through which a liquid dispersion medium does not readily penetrate but may preferably be a film of a plastic material such as polyester, or a metal such as aluminum because it has a good surface characteristic and allows easy selection of materials constituting the fluid ink 2.

A fundamental arrangement of the recording apparatus according to the present invention has been described above. Now, a typical embodiment of the recording method according to the present invention will be explained while explaining the operation of the above-mentioned recording apparatus.

Referring again to FIG. 1, the ink 2 in the ink container 3 is substantially non-adhesive and can be imparted with an adhesiveness on application of a pH change. An example of such ink 2 may be obtained by impregnating a crosslinked substance such as guar gum or polyvinyl alcohol with a liquid dispersion medium such as water.

The ink 2 may preferably be a fluid ink having a fluid layer-forming property. Herein, "fluid layer-forming property" refers to a property of the fluid ink that it flows under application of a certain external force to form a layer or film thereof, e.g., on an ink-carrying member. It is preferred that the thus formed ink film or layer can be transferred by an external force. Such fluid ink is preferably one having a property that even if it is cut or separated into a plurality of pieces, they can be re-united into a single mass through adhesion with the elapse of time when placed together.

Referring to FIG. 1, the fluid ink 2 is carried on the ink-carrying roller 1 and conveyed in an arrow D direction along with the rotation in the arrow A direction of the roller 1.

The fluid ink 2 moved in this way is patternwise supplied with the above-mentioned pH modifier from the pH modifier-supplying means 55 at a pH change position where the modifier supplying means 55 is disposed opposite to the ink-carrying roller 1. As a result, the fluid ink 2 is selectively imparted with an adhesiveness, because of a change in pH value caused by the supply of the pH modifier.

A portion of the fluid ink 2 selectively imparted with an adhesiveness is further moved in the arrow D direction to reach the ink transfer position where the transfer-receiving medium 6 on the platen roller 4 contacts the ink 2, and the adhesive portion of the ink 2 is transferred onto the transfer-receiving medium 6 moving in the arrow C direction to form an ink pattern 21 thereon.

The ink pattern 21 may be developed, as desired, by a known developing means (not shown) such as one using toner particles disposed above the transfer-receiving medium 6 downstream of the ink transfer position.

The remainder of the fluid ink 2 not transferred to the transfer-receiving medium 6 at the ink transfer position is further conveyed in the arrow D direction to be separated from the transfer-receiving medium 6 because of its non-adhesiveness and the action of gravity, etc., and recycled to the ink container 3 for reuse.

While a representative embodiment of the image recording apparatus or method according to the present invention has been described above, the ink-carrying member can be in the form of a belt or a sheet (inclusive of film) instead of a cylindrical roller as described above. It is preferred that such a belt- or sheet-form ink carrying member is disposed in an endless form so as to be capable of being used repeatedly in view of the cost of the material.

In the above embodiment described with reference to FIG. 1, the adhesive pattern of the fluid ink 2 is directly transferred to the transfer-receiving medium 6 of a sheet form such as a plastic film. In order to obtain an ink image finally on an ordinary recording medium such as plain paper, it is preferred, as shown in FIG. 2, that the adhesive ink pattern is once transferred to an intermediate transfer medium **6*a* to form thereon an ink pattern 21, which is then transferred onto a recording medium 7** such as plain paper.

Referring to FIG. 2, at the ink transfer position in this embodiment, an ink-carrying roller 1 is disposed below and with a certain gap from a intermediate transfer roller **6*a* which is composed of, e.g., a cylinder of iron coated with a hard chromium plating, and rotates in the direction of an arrow B. The intermediate transfer roller 6*a* is disposed so that the surface thereof may contact a layer 2*a* of the fluid ink 2 formed on the ink-carrying roller 1**.

The peripheral surface of the intermediate transfer roller **6*a* may be composed of a similar material as that constituting the surface of the ink-carrying roller 1, but may preferably be provided with an improved smoothness, anti-staining characteristic, or cleaning facility, e.g., by plating of chromium, etc. In order to improve the selective transfer of the ink 2 ât the ink transfer position, it is preferred that the surface of the intermediate transfer roller 6*a* has a higher smoothness than that of the ink-carrying roller 1**.

It is preferred that a certain shear stress is applied to the layer of the ink 2 sandwiched between the intermediate transfer roller **6*a* and the ink-carrying roller 1 at the ink transfer position. For this reason, it is preferred that the peripheral speed of the intermediate transfer roller 6*a* is made equal to or smaller than, particularly about 50–95% of, the superficial peripheral speed of the ink layer (on the side thereof contacting the roller 6*a*) on the ink-carrying roller 1**.

On the other hand, if the peripheral speed of the intermediate transfer roller **6*a* is larger than the superficial peripheral speed of the ink layer on the ink-carrying roller 1, an undesirable phenomenon of the whole ink layer being transferred to the intermediate transfer roller 6*a*** under no pH change is liable to occur.

Further, when the surfaces of the intermediate ink roller **6*a* and the ink-carrying roller 1 are composed of similar materials and have almost the same smoothness, it is preferred to apply a certain shear stress as described above to the layer of the ink 2 at the ink transfer position. The utilization of such a shear stress closely relates to rheological characteristics of the ink, such as thixotropy, pseudoplasticity, and dilatancy, and is preferred in order to improve the selective transfer characteristic of the ink 2**.

Referring to FIG. 2, at an ink pattern transfer position a recording medium 7 of, e.g., plain paper is disposed in contact with the surface of the intermediate transfer roller **6*a* (i.e., the surface on which an ink pattern 21 is to be formed) and is conveyed in an arrow E direction. Further, so as to movably sandwich the recording medium 7 with the intermediate transfer roller 6*a*, a platen roller 4*a* having a surface of silicone rubber, etc., and rotating in an arrow F direction is disposed opposite to the intermediate transfer roller 6*a***.

Above the ink-carrying roller 1 at a pH change position upstream from the ink transfer position where the ink-carrying roller 1 and the intermediate transfer roller **6*a* are disposed opposite to each other, a pH modifier-supplying means 55 is disposed with a certain spacing from the surface of the roller 1, similarly as in FIG. 1**.

Further, upstream from the pH change position where the pH modifier-supplying means 55 faces the ink-carrying roller 1, a blade 9 as an ink layer thickness-regulation means for regulating the thickness of a layer **2*a* of the ink 2 on the roller 1 may be disposed, as desired, opposite to and with a certain gap from the ink-carrying roller 1**.

Further, a cleaning means 11 having a blade 10 of, e.g., urethane rubber, may be disposed as desired, above and so as to be capable of contacting the intermediate roller **6*a* at a position downstream from the above-mentioned ink image-transfer position where the intermediate transfer roller 6*a* and the platen roller 4*a*** are disposed opposite to each other.

Among the above described members, the ink-carrying roller 1, ink container 3, intermediate transfer roller **6*a*, pH modifier-supplying means 55, blade 9 and cleaning means 11 are housed in an outer casing 12**.

In the embodiment shown in FIG. 2, an ink pattern 21 which is formed on the intermediate transfer roller **6*a* in the same manner as in FIG. 1** is transferred onto the recording medium 7 at the ink image-transfer position to form a transfer-recorded image 22 thereon.

In the embodiment of FIG. 2, the recording medium 7 does not directly contact the layer 2*a* of the fluid ink 2 per se on the ink-carrying roller 1, so that the flexibility in constitution of the recording medium 7 or the fluid ink 2 is increased. From this point, the embodiment of FIG. 2 is preferred one. Further, the intermediate transfer medium may preferably be in the form of an intermediate roller 6*a* as shown in FIG. 2, in order to accurately control the ink transfer conditions by adjusting the conveying speed at the ink transfer position and to facilitate pressure transfer at the ink image-transfer position. Incidentally, when a transferred pattern 22 formed on the recording medium 7 is not sufficiently fixed on the recording medium 7, it is possible to dispose a known fixing means by way of heating, pressing, etc., (not shown) at a point downstream from the ink image-transfer position along the recording medium 7.

Then, there will be described another embodiment of an image recording apparatus according to the present invention, with reference to a schematic sectional view of FIG. 3.

Figure 3:
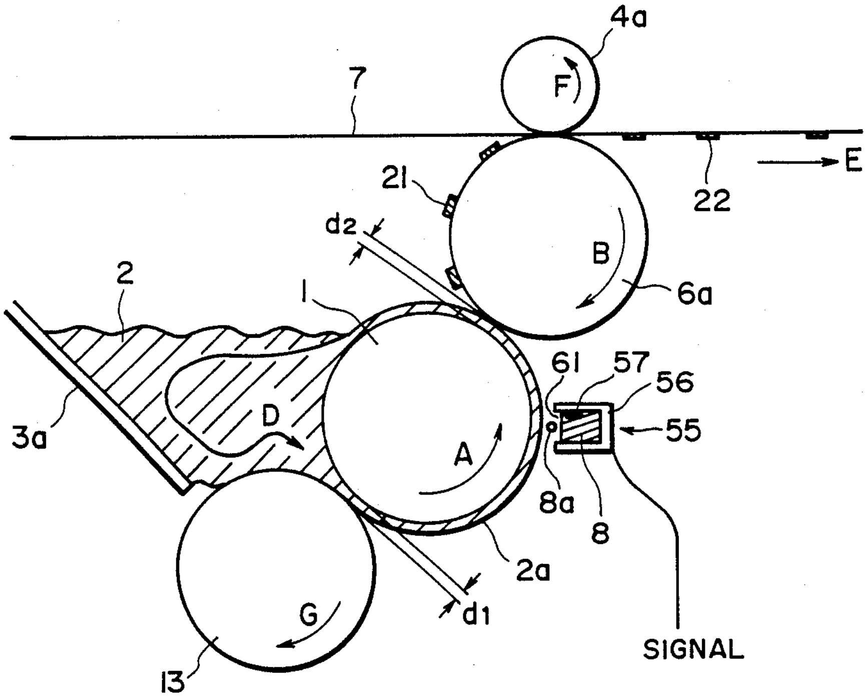

In the apparatus shown in FIG. 3, an ink 2 is applied onto an ink-carrying member 1 according to a roller coating method. When such roller coating method is used, there may more easily be obtained an ink layer 2*a* having a uniform thickness.

Referring to FIG. 3, there is provided an ink-holding member 3*a* being capable of holding therein an ink 2. Below the ink-holding member 3*a*, i.e., on the side of an ink-supply part thereof through which the ink 2 can be flown, there is disposed an ink-application roller 13 for applying the ink 2 onto the ink-carrying roller 1, which is rotatable in the direction of an arrow G. The embodiment shown in FIG. 3 is substantially the same as that shown in FIG. 2 except that the image-recording ink 2 is applied onto the ink-carrying roller 1 by means of the ink-holding member 3*a* and the ink application roller 13.

Next, a somewhat detailed explanation is made on the fluid ink 2 suitably used in the above-mentioned image recording method or apparatus.

The ink used in the present invention may be one being substantially non-adhesive, more preferably, further having a fluid layer-forming property. More specifically, an ink satisfying the following property may preferably be used.

NON-ADHESIVENESS (OR LIQUID DISPERSION MEDIUM-RETAINING ABILITY)

On the surface of a sample ink held in a container, an aluminum foil of 5 cm×5 cm in size is, after being accurately weighed, placed gently and is left standing as it is for 1 min in an environment of a temperature of 25° C. and a moisture of 60%. Then, the aluminum foil is gently peeled off from the surface of the fluid ink and then quickly weighed accurately to measure the increase in weight of the aluminum foil. Through the measurement, the fluid ink used in the present invention should preferably show substantially no transfer of its solid content and a weight increase of the aluminum foil of about 0–1000 mg, particularly on the order of 0–100 mg. In the above measurement, it is possible to separate the aluminum foil from the fluid ink body, if necessary, with the aid of a spatula.

If the non-adhesiveness of the ink used in the present invention is insufficient in the light of the above standard, the ink per se can transfer to a transfer-receiving medium to a practically non-negligible extent even under no pH change, thus resulting in a lower image quality. Further, in such case, a relatively large amount of the liquid dispersion medium can be transferred to the transfer-receiving medium, whereby it is troublesome to remove the dispersion medium.

In a case where a relatively large amount of the liquid dispersion medium is transferred to a transfer-receiving medium, the reflection density of a non-image portion of the transfer-receiving medium (i.e., a portion thereof corresponding to an ink portion with no pH change) may be measured instead of the above-mentioned adhesion test using an aluminum foil.

More specifically, a transferred image is formed on a transfer-receiving medium 6 or recording medium 7 having a reflection density of 0.06–0.07, such as plain paper by means of image recording apparatus as shown in FIGS. 1 to 3 so that the transferred image may have a reflection density of about 1.0–2.0 in the image portion thereof. In such case, the reflection density of the resultant non-image portion of the transfer-receiving medium 6 or recording medium 7 may preferably be 0.10 or below.

On the other hand, in a case where a layer 2*a* of the ink 2 is formed by means of an ink application roller 13 as shown in the schematic sectional view of FIG. 3, the ink may preferably be measured as a viscoelastic material. More specifically, an ink is formed into a disk shape having a diameter of 25 mm and a thickness of 2 mm, and a sine strain with an angular velocity of 1 rad/sec is applied to the ink sample at 25° C. by means of Rheometer RMS-800 (mfd. by Rheometrics Inc., U.S.A.). In such case, the ink used in the present invention may preferably show a ratio (G″/G′) of the loss elasticity modulus (G″) to the storage elasticity modulus (G′) of 0.1–10.

The ink used in the image forming method according to the present invention may preferably be an ink in the form of a gel, in a broad sense, comprising a cross-linked substance impregnated with and holding therewith a liquid dispersion medium, more preferably, an ink in the form of a sludge obtained by dispersing particles having a particle size of preferably 0.1–100 μm, further preferably 1–20 μm, in the above-mentioned gel ink.

with respect to the former gel ink of these inks, it is presumed that the gel ink is not substantially transferred to a transfer-receiving medium 6 because the liquid dispersion medium except for a minor portion thereof is well retained in the crosslinked structure.

With respect to the latter sludge ink, it is presumed that the ink is not substantially transferred to a transfer-receiving medium 6 because the particles are tightly aligned on the ink interface so that the contact of the dispersion medium to the transfer-receiving medium 6 is suppressed. Particularly in this sludge ink, when a rotating ink-carrying member is used, the particles in the ink are aligned on the outer surface of the ink layer under the action of a centrifugal force, whereby the ink desirably behaves like a dilatant fluid.

It is also presumed that when the pH of the gel ink or the sludge ink is changed, or a transfer of electrons is caused, the crosslinked structure or the alignment state of the particles is changed thereby, so that the fluid ink is imparted with an adhesiveness in a pattern corresponding to the pH change pattern.

In the image recording method of the present invention, when nearly 100% of the ink portion provided with adhesiveness is not transferred to a transfer-receiving medium 6 or intermediate transfer medium 6a, or a final transfer medium (i.e., a recording medium 7), i.e., when an ink which remains on the ink-carrying roller 1 or the intermediate transfer roller 6a after the transfer thereof is not negligible in practice, it is preferred that the above-mentioned change in crosslinked structure, etc., is a reversible one.

Further, it is preferred that the ink substantially retains the change in the crosslinked structure, etc., during the period from the time at which it is subjected to a pH change at the pH change position, to the time at which it is transferred to a transfer-receiving medium 6 at the ink transfer position.

The image recording ink having the above characteristic may preferably comprise a crosslinked substance impregnated with a liquid dispersion medium.

Herein, the "crosslinked substance" refers to a single substance which per se can assume a crosslinked structure, or a mixture of a substance capable of assuming a crosslinked structure with the aid of an additive such as a crosslinking agent for providing a crosslinking ion such as borate ion, and the additive. Further, the term "crosslinked structure" refers to a three-dimensional structure having a crosslinkage or crosslinking bond. The crosslinkage may be composed of any one or more of covalent bond, ionic bond, hydrogen bond and van der Waal's bond.

In the ink used in the present invention, the crosslinked structure is only required to be such that a desired degree of liquid dispersion medium-retaining property is given thereby. More specifically, the crosslinked structure may be any one of a network, a honeycomb, a helix, etc., or may be an irregular one.

The liquid dispersion medium in the ink 2 used in the present invention may be any inorganic or organic liquid medium which is preferably liquid at room temperature. The liquid medium should preferably have a relatively low volatility, e.g., one equal to or even lower than that of water.

In case where an aqueous or hydrophilic dispersion medium is used as the liquid dispersion medium, the crosslinked substance may preferably be composed of or from a natural or synthetic hydrophilic high polymer or macromolecular substance.

Examples of such a hydrophilic high polymer include: plant polymers, such as guar gum, locust bean gum, gum arabic, tragacanth, carrageenah, pectin, mannan, and starch; microorganism polymers, such as xanthane gum, dextrin, succinoglucan, and curdran; animal polymers, such as gelatin, casein, albumin, and collagen, cellulose polymers such as methyl cellulose, ethyl cellulose, and hydroxyethyl cellulose; starch polymers, such as soluble starch, carboxymethyl starch, methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrrolidone, polyvinyl methyl ether, carboxyvinyl polymer, and sodium polyacrylate; and other synthetic polymers, such as polyethylene glycol, and ethylene oxide-propylene oxide block copolymer. These polymers may be used singly or in mixture of two or more species, as desired.

The hydrophilic polymer may preferably be used in a proportion of 0.2–50 parts, particularly 0.5–30 parts, with respect to 100 parts of the liquid dispersion medium.

In the ink used in the present invention, a polyelectrolyte may further preferably be used as the above-mentioned crosslinked substance. The "polyelectrolyte" used herein refers to a polymer or macromolecular substance having a dissociative group in the polymer chain thereof.

In a case where such polyelectrolyte is used, there is not necessarily required the addition of another electrolyte for providing an electroconductivity or conduction-heat generating capability to the ink, or the addition of an ionic crosslinking agent (such as borate ion) for facilitating the adhesiveness control. As a result, the stability or storability of the ink may desirably be improved because of the simplification of the ink system.

Examples of the polyelectrolyte capable of providing a poly ion when dissociated in water may include, e.g., natural polymers such as alginic acid and gelatin; and synthetic polymers obtained by introducing a dissociative group into ordinary polymers, such as polystyrenesulfonic acid and polyacrylic acid. Among these polyelectrolytes, an amphoteric polyelectrolytes capable of being dissociated as either an acid or a base, such as a protein may preferably be used, in order to obtain a desired change in the ink adhesiveness based on a pH change. The reason for this is that the pH value of such ink may easily be changed reversibly and the ink may easily be reused.

There may be particularly preferably be used an amphoteric polyelectrolyte having an isoelectric point of 4–10, more preferably 4.5–9. Such amphoteric polyelectrolyte may preferably be a peptide or a protein, particularly gelatin.

On the other hand, when oil such as mineral oil or an organic solvent such as toluene is used as the liquid dispersion medium, the crosslinked substance may be composed of or from one or a mixture of two or more compounds selected from metallic soaps inclusive or metal stearates, such as aluminum stearate, magnesium stearate, and zinc stearate, and, similar metal salts of other fatty acids, such as palmitic acid, myristic acid, and lauric acid; or organic substances such as hydroxypropyl cellulose derivative, dibenzylidene-D-sorbitol, sucrose fatty acid esters, and dextrin fatty acid esters. These crosslinked substances may be used in the same manner as the above-mentioned hydrophilic polymers.

When the hydrophilic polymer, polyelectrolyte or metallic soap, etc., is used, the layer-forming property and liquid dispersion medium-retaining ability of the resultant ink vary to some extent depending on the formulation of these components or combination thereof with a liquid dispersion medium. It is somewhat difficult to determine the formulation or composition of these components in a single way. Accordingly, it is preferred to formulate a composition of a liquid dispersion medium and a crosslinked substance so that the resultant ink will satisfy the layer-forming property and non-adhesiveness (liquid dispersion medium-retaining property) as described above.

The image recording ink used in the present invention may preferably comprise a liquid dispersion medium and a crosslinked substance (inclusive of polyelectrolyte), as described above, and may further comprise, as desired, a colorant inclusive of dye, pigment and colored fine particles, a color-forming compound capable of generating a color under a pH change, an electrolyte providing an electroconductivity or conduction-heat generating capability to the ink, or another additive such as an antifungal agent or an antiseptic.

The colorant or coloring agent may be any of dyes and pigments generally used in the field of printing and recording, such as carbon black. Among these, a dye or pigment, particularly a pigment, having a relatively low affinity to the liquid dispersion medium is preferably used in order to suppress the coloring of the transfer-receiving medium, due to the transfer thereto of the liquid dispersion medium under no pH change. The pigment or dye may preferably be used in a proportion of 0.1 part or more, more preferably 5–50 parts, particularly 10–30 parts, per 100 parts of the liquid dispersion medium.

Further, the colorant may be in the form of fine colored particles, like a toner of various colors for electrophotography, obtained by dispersing a pigment or dye as described above in a natural or synthetic resin and forming the dispersion into fine particles. An ink containing such colored particles behaves like a dilatant liquid and is particularly preferred in respect of suppressing the transfer of the liquid dispersion medium to or coloring of the transfer-receiving medium under no pH change.

The colored fine particles may preferably be used in a proportion of 1 part or more, further preferably 5–100 parts, particularly preferably 20–80 parts, per 100 parts of the liquid dispersion medium. Generally speaking, it is preferred that colored particles having a large size are incorporated in a higher proportion in order to provide a better coloring characteristic. Incidentally, the above-mentioned toner particles can be used regardless of the electrophotographic characteristic such as charging characteristic thereof.

The colorant inclusive of the pigment or the colored fine particles may preferably have a particle size of 0.1–100 μm, particularly 1–20 μm.

If the particle size is below 0.1 μm, the colorant particles are not retained in the crosslinked structure but are transferred together with the liquid dispersion medium even when the ink contacts the intermediate transfer medium or the recording medium under no pH change, whereby an image fog is liable to result. On the other hand, if the particle size exceeds 100 μm, a resolution required for an ordinary image is not satisfied.

The image recording ink used in the present invention may be obtained from the above components, for example, by uniformly mixing a liquid dispersion medium such as water, a crosslinked substance such as a polyelectrolyte, and also an optional additive such as a crosslinking agent, a colorant, an electrolyte, etc., under heating as desired, to form a viscous solution or dispersion, which is then cooled to be formed into a gel state.

Incidentally, when colored particles such as toner particles are used as a colorant, it is preferred that a crosslinked substance and a liquid dispersion medium are first mixed under heating to form a uniform liquid, and then the colored particles are added thereto. In this case, it is further preferred that the addition of the particles is effected in the neighborhood of room temperature so as to avoid the agglomeration of the particles.

The thus obtained ink, when subjected to a pH change, is at least partially subjected to a change in or destruction of the crosslinked structure to be reversibly converted into a sol state, whereby it is selectively imparted with an adhesiveness corresponding to the pH change pattern. Alternatively, the dissociation state of the polyelectrolyte contained in the ink may change, whereby the ink is selectively imparted with an adhesiveness corresponding to the pH change.

Hereinabove, there has been described the ink used in the image recording method of the present invention. Now, there will be described a pH modifier, i.e., a substance capable of causing a desired pH change on (or in) the ink.

Preferred examples of such pH modifier include an electron acceptor (or electron pair-acceptor) and an electron donor (or electron pair-donor).

Specific examples of the electron acceptor include: Lewis acids such as hydrochloric acid, nitric acid, acetic acid, chloric acid, hypochlorous acid, carbolic acid, sulfuric acid, sulfurous acid, carbonic acid, oxalic acid, hydrogen sulfide, phosphoric acid, and boric acid. The pH value of the ink may be changed to the acidic side by adding or imparting such electron acceptor thereto, whereby the ink is imparted with a desired adhesiveness.

On the other hand, specific examples of the electron donor include: Lewis base such as sodium hydroxide, potassium hydroxide, ammonia, ammonium hydroxide, calcium hydroxide, barium hydroxide, copper hydroxide, magnesium hydroxide, ferric hydroxide, aluminum hydroxide; or amines such as methylamine, ethylamine, octylamine, cetylamine, dibutylamine, dimethylamine, trimethylamine, allylamine, dipropylamine, anilin, methylaniline, and triethanolamine. The pH value of the ink may be changed to the basic side by adding or imparting such electron donor thereto, whereby the ink is imparted with a desired adhesiveness.

In order to enhance the reproducibility in the change of the crosslinked structure, it is preferred that the above-mentioned electron donor or acceptor is used as a solution thereof which has been obtained by dissolving it in a liquid of the same material as the liquid dispersion medium (such as water) of the ink.

As a means for imparting the electron acceptor or donor to the ink, devices used in the conventional ink-jet printing system of a so-called "continuous-type" or "on demand-type" may be used without particular limitation. In these devices, an ink is jetted or deflected under the action of heat, electric field, pressure, etc. In such case, the liquid which is supplied from the nozzle of the above-mentioned ink-jet device to the ink 2 may be a low-viscosity liquid (such as a solution) containing no dye or pigment. As a result, there is hardly caused a problem of clogging of the nozzle or solidification of the ink which has been encountered in the conventional ink-jet system during a period of non-use. Further, in the present invention, the ink to be used for image formation of which pH value has been changed has a relatively high viscosity, and therefore it causes little spreading or blurring of the resultant image when transferred to paper.

Hereinbelow, a specific embodiment of such pH modifier-supplying means is described with reference to a schematic perspective view of FIG. 4.

Figure 4:
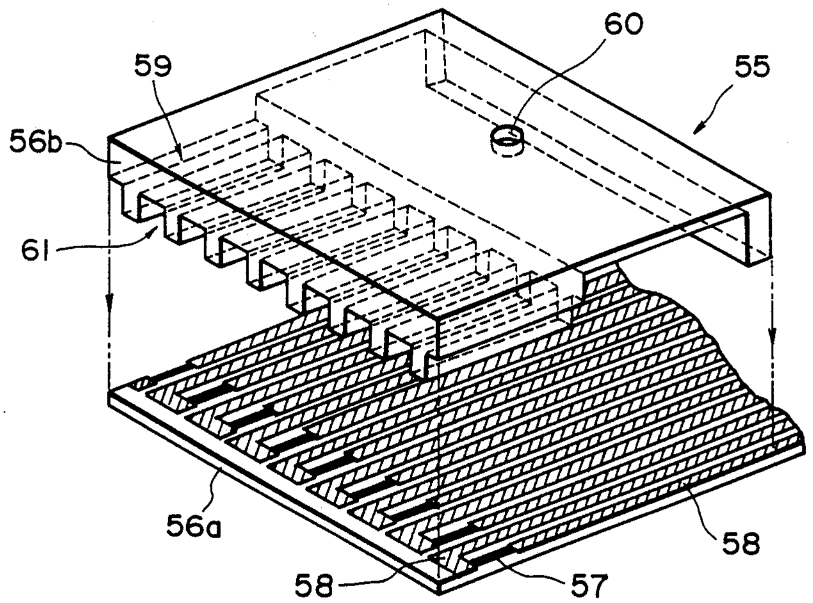
FIG. 4 is a schematic perspective view showing an embodiment of a liquid-jetting means suitably used in the present invention.

Referring to FIG. 4, such pH modifier-supplying means 55 (or demand-type) is a device of multinozzle bubble jet-type which comprises two substrates **56*a* and 56*b* joined to each other. On one substrate 56*a*, a plurality of electrode elements 58 are disposed, and a resistance heating element 57 is disposed between a pair of the electrode elements 58. On the other glass substrate 56*b* disposed opposite to the above-mentioned substrate 56*a*, a plurality of grooves 59 are formed, and a liquid inlet 60 are formed therein. A plurality of nozzles (or orifices) 61 for jetting a liquid are formed by joining these two substrates 56*a* and 56*b*. The bubble jet-type device 55 as a pH modifier-supplying means is so constituted that a liquid poured thereinto through the liquid inlet 60 may be retained or held in the nozzles 61**.

Referring again to FIG. 1, in the thus constituted pH modifier-supplying means 55, when the heat-generating element 57 generates heat due to electric conduction, a bubble is formed in a liquid 8 disposed in the nozzle 61 on the basis of a liquid-gas phase change, whereby a part of the liquid 8 is jetted from the nozzle 61 as a droplet 8*a*.

Incidentally, in a case where a solid image (e.g., a solid black image) is formed, it is preferred that the electron acceptor or electron donor is imparted to the entire surface of an ink, e.g., by means of a roller for a rotary press, in view of the reduction in patternwise energy consumption (e.g., with respect to the energy to be supplied to the abovementioned pH modifier-supplying means 55).

According to our knowledge, e.g., when a polyvinyl alcohol crosslinked with borate ions is used as the crosslinked substance, the change in the crosslinked structure caused by a pH change may be considered as follows.

Thus, when the borate ion bonded to the —OH groups of the polyvinyl alcohol,

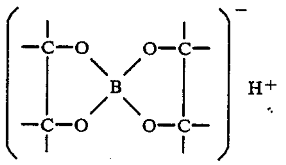

is subjected to the addition of an electron acceptor such as hydrochloric acid, the pH of the ink is changed to the acidic side and electrons may be removed from the above-mentioned borate ion to destroy at least a part of the crosslinked structure, whereby the ink may be imparted with an adhesiveness selectively or imagewise. The reaction at this time may presumably be expressed by the following formula:

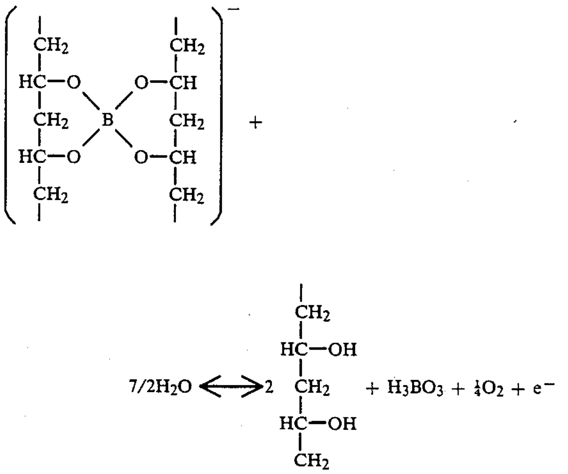

Further, there is explained an embodiment wherein a change in the dissociation condition of a polyelectrolyte based on a pH change is utilized.

Thus, in a case where a peptide compound comprising at least one amino acid is used as the polyelectrolyte, when the pH of the ink is changed to the basic side due to the addition of an electron donor, a $—NH_3^+$ group of the amino acid is changed to a $—NH_2$ group. On the other hand, when the pH of the ink is changed to the acidic side due to the addition of an electron acceptor, a —COO— group of the amino acid is changed to a —COOH group. Because of such change in the dissociation condition of the amino acid, there may be caused a change in the crosslinked structure whereby a difference in the ink adhesiveness is provided.

According to our knowledge, the reaction at this time may presumably be expressed by the following formula:

$$\underset{\text{acidic pH side}}{\overset{+}{H_3N}RCOOH} \xleftarrow{(2)} \underset{\text{amino acid at isoelectric point}}{\overset{+}{H_3N}RCOO^-} \xrightarrow{(1)} \underset{\text{basic pH side}}{H_2NRCOO^-}$$

(1): addition of an electron donor
(2): addition of an electron acceptor

Figure 5:
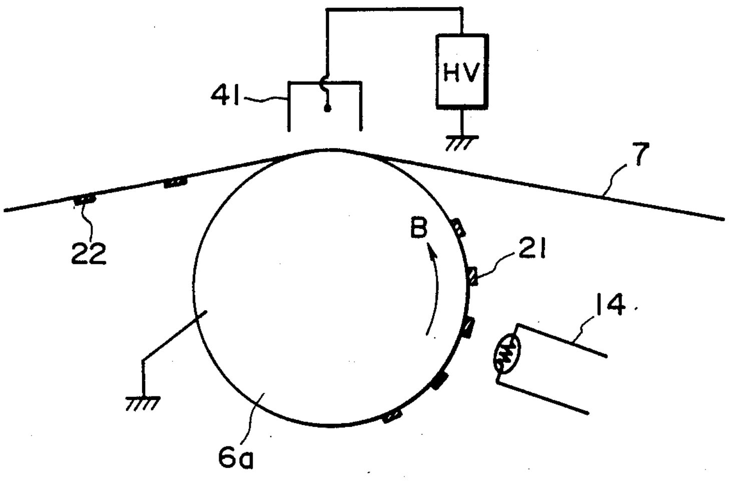

Incidentally, as a means for transferring the ink pattern 21 on the intermediate transfer roller 6*a* onto the recording medium 7, a corona charge transfer device 41 as shown in FIG. 5 can be used instead of the platen roller 4*a* as a pressure means as shown in FIG. 2. In this case, as shown in FIG. 5, it is preferred to dispose a drying means 14 such as a heater facing the roller 6*a* upstream of the transfer means 41, so that the content of the liquid dispersion medium such as water in the ink pattern 21 on the intermediate transfer roller 6*a* is decreased in advance.

Figure 6:
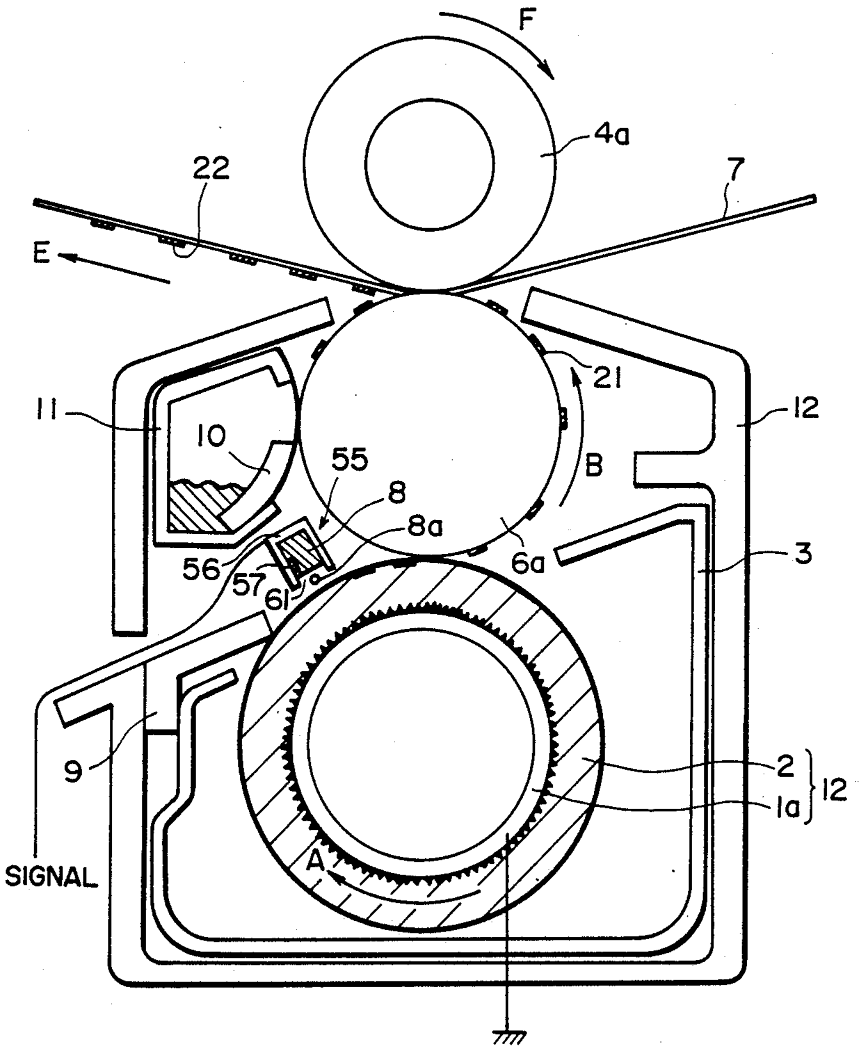

In the above-described embodiments of the image recording method as shown in FIGS. 1 to 3, there is used an ink which has a fluidity at room temperature (e.g., one in the form of a soft gel). In a case where an ink not having a fluidity at room temperature (e.g., one in the form of a hard gel) is used, e.g., a layer of an ink 2 is formed on a core 1*a* (i.e., an ink-carrying member) is advance to form an ink roll 12, as shown in FIG. 6. Such ink roll 12 may be used in the same manner as in the embodiment shown in FIG. 2, instead of the ink-carrying roller 1 and the ink layer 2*a* formed thereon which are used in FIG. 2.

In the embodiment as shown in FIG. 6, e.g., the surface of the ink roll 12 may preferably be smoothed by using a smoothing means 9 such as a blade, in order to easily effect a successive recording. Further, it is preferred that an electron donor (or electron acceptor) may preferably be supplied to a relatively small roller (not shown) disposed in contact with the surface of the ink 2, thereby to smooth the surface of the ink roller 12. Further, in this case, a smoothing means comprising a blade, etc., may preferably be used in combination with the above-mentioned relatively small roller.

In the above-described embodiments of the present invention, the pH value of an ink 2 is changed by the addition of an electron donor or electron acceptor, thereby to impart a selective adhesiveness to the ink. Further, in the present invention, the pH of the ink 2 may be changed by the application of heat energy.

In such case, e.g., an acidic or alkaline substance may be encapsulated and mixed in the ink. More specifically, a solid acid such as phenol may for example be microencapsulated and mixed in the ink, and the acid is caused to contact the ink by the breakage or rupture of the capsule on application of a heat energy to acidify the ink, whereby the pH of the ink is selectively changed.

In case of using heat energy, contact or noncontact heating means as used in the conventional thermal transfer process as a heat source may be used without particular restriction, inclusive of a thermal head, a current conduction heating, radiation beam such as laser beam and infrared rays, or induction heating.

As described hereinabove, according to the present invention, there are provided an image recording method wherein a specific ink is used to provide a recorded image at a very low running cost without using a conventional, expensive ink ribbon having a solid ink layer; and also a recording apparatus suitably used in the image recording method.

More specifically, according to the recording method of the present invention, image recording is easily effected at an extremely low recording cost than the thermal transfer recording method and free from plugging or a nozzle or blurring of recorded images as encountered in the ink-jet recording method.

Hereinbelow, the present invention will be explained with reference to Examples.

EXAMPLE 1

| | |
|---|---|
| Water | 100 parts |
| Guar gum | 1 part |
| (Emco Gum (trade name) mfd. by Meyhall, Switzerland) | |
| Sodium borate ($Na_2B_4O_7.10H_2O$) | 0.05 part |

The above ingredients were uniformly mixed under heating at 90° C. and then left-standing at room temperature to form a gel ink retaining a high percentage of water and having an indefinite shape, i.e., a fluidity. The pH of the ink was adjusted to 7–11 by using an acid or alkali.

Figure 7A:
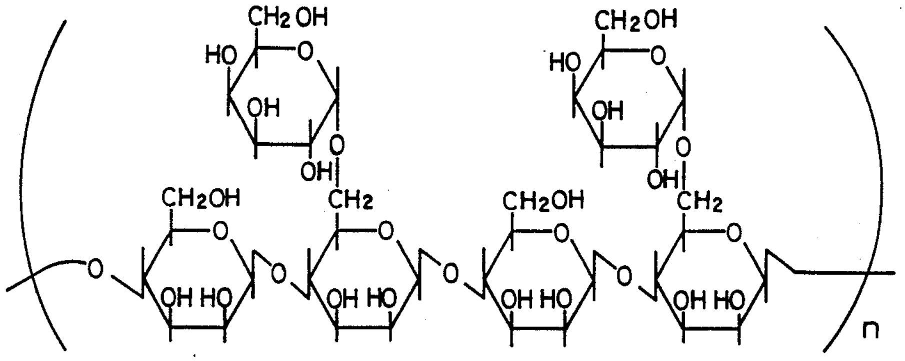
FIGS. 7A and 7B represent structural formulas of a hydrophilic polymer and a borate ion, respectively used in the present invention.
Figure 7B:
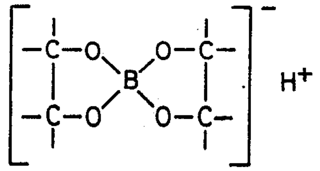

In the gel ink, it was assumed that the cis-OH groups at C2 and C3 in the mannose chain and/or the cis-OH groups at C3 and D4 in the galactose branch of the guar gum (FIG. 7A) were crosslinked by the borate ions (FIG. 7B).

The pH of the gel ink was lowered to below 7 by the addition of hydrochloric acid to be once converted into a viscous sol, into which 50 parts of toner particles of 10 μm size (cyan toner, before addition of externally added fluidity improver, for NP color copier, mfd. by Canon K.K.) were added and uniformly mixed. Then, the mixture was again brought to a pH 8 to obtain a gel ink in the form of sludge.

The sludge ink was charged in an image recording apparatus as shown in FIG. 2 wherein an ink-carrying roller 1 comprising a cylindrical roller of 20 mm in diameter having a surface of stainless steel with a surface roughness of 1S and an intermediate transfer roller 6*a* comprising an iron cylindrical roller of 20 mm in diameter having a surface coated with a hard chromium plating were disposed opposite to each other with a gap of 2 mm at a transfer position. The sludge ink 2 obtained above was charged in the ink container 3.

The ink-carrying roller 1 was rotated in the arrow A direction at about 60 rpm to form thereon a layer 2*a* of the ink 2, and in contact with the ink layer 2*a*, the intermediate transfer roller 6*a* was rotated in the arrow B direction at about 50 rpm. In this instance, when an acidic liquid was not supplied from a pH modifier-supplying means 55 to the ink layer 2*a*, a very slight amount of water was transferred to the intermediate transfer roller 6*a*, but the ink 2 was not substantially transferred to the intermediate transfer roller 6*a*. The pH modifier-supplying means 55 had a structure as shown in FIG. 4, and comprised the head portion of an ink-jet printer (Model: BJ-80, mfd. by Canon K.K.).

On the other hand, a 0.1N-HCl aqueous solution (pH=2), instead of the ink for an ink-jet system, was poured into the pH modifier-supplying means 55 through a liquid inlet 60 and held in the nozzle 56 thereof. Then, when a heating element 57 was selectively caused to generate heat corresponding to an image information signal to patternwise supply the above-mentioned HCl aqueous solution to the ink layer 2*a*, the ink 2 was selectively transferred to the intermediate transfer roller 6*a* to form an ink pattern 21 thereon.

At the ink image transfer position, a platen roller 4*a* of a 12 mm-dia. iron cylindrical roller surfaced with 4 mm-thick silicone rubber layer was disposed opposite to the intermediate transfer roller 6*a* with a recording medium 7 of plain paper disposed therebetween moving in the arrow E direction. Further the platen roller 4*a* was rotated in the arrow F direction at the same speed as the intermediate transfer roller 6*a* while exerting a slight pressure onto the recording medium 7. As a result, cyan-colored dot images were formed on the recording medium 7.

The cyan-colored dot images were fixed onto the recording medium 7 by means of a hot roller fixer (not shown) disposed downstream from the ink image transfer position and heated to 180° C., whereby well-fixed images were obtained. A slight amount of the ink remaining on the intermediate transfer roller 6*a* downstream of the ink image transfer position was removed by means of a cleaner 11 having a blade 10 of urethane rubber.

According to our knowledge, it is presumed that the above image formation was effected because at least a part of the crosslinked structure is destroyed by the pH change based on the above-mentioned addition of the HCl solution, whereby the ink was imparted with an adhesiveness selectively or imagewise.

Further, in this Example wherein only a very slight part of the ink 2 was subjected to breakage of the crosslinked structure, the restoration of the gel structure was observed in several seconds to several tens of seconds.

We believe that the restoration of the gel structure is presumably caused by diffusion of ions, but the period of the several seconds to several tens of seconds is long enough to transfer a portion of the ink which has been imparted with an adhesiveness based on the addition of the acidic liquid to the intermediate transfer roller 6*a* and is short enough to reuse the non-transferred remaining portion for further operation.

Incidentally, in this instance, it was preferred that the liquid dispersion medium of the ink was so composed as to function as a buffer solution, in order to prevent a long-term pH change of the ink caused by the addition of an acidic solution.

EXAMPLE 2

| <Composition A> | |
|---|---|
| Water | 100 parts |
| Polyvinyl alcohol | 9 parts |
| (PVA 203, mfd. by Kuraray K.K., polymerization degree: about 3000, saponification degree: 88 mol %) | |
| Water-soluble red dye | 3.6 parts |
| Colloidal silica | 12 parts |

-continued

| | |
|---|---|
| (RA200-5, mfd. by Nihon Aerosil K.K.) | |
| <Composition B> | |
| Borax (decahydrate) ($Na_2B_4O_7.10H_2O$) | 0.6 part |

The above ingredients of Composition A were uniformly mixed under heating at 70° C. To the resultant mixture, Composition B was added and mixed therewith, and leftsanding at room temperature to form a gel ink retaining a high percentage of water and having an indefinite shape, i.e., a fluidity. At this time, it was preferred to adjust the pH of the ink to 8 by using an acid or alkali.

In the thus prepared gel ink, it was assumed that —OH groups of the polyvinyl alcohol were crosslinked by borate ions.

The thus obtained gel ink was formed into a disk shape having a diameter of 25 mm and a thickness of 2 mm. A sine strain with an angular velocity of 1 rad/sec was applied to the ink sample at 25° C. by means of Rheometer RMS-800 (mfd. by Rheometrics Inc. U.S.A.).

As a result, the ratio (G″/C′) of a loss elasticity modulus (G″) to a storage elasticity modulus (G′) was 1.6.

Then, by using the above-mentioned gel ink, image formation was effected by means of a recording apparatus as shown in FIG. 3.

Referring to FIG. 3, an ink-application roller 13 comprising a cylindrical roller of 40 mm in diameter having a surface of stainless steel an ink-carrying roller 1 comprising a stainless steel cylindrical roller of 40 mm in diameter (2 mm in wall) of which surface had been subjected to sand blasting or blame spraying treatment so as to provide a surface roughness of $R_Z=100\mu$ were disposed opposite to each other with a gap of $d_1=1.8$ mm at an ink supply position. Further, an intermediate transfer roller 6a comprising an iron cylindrical roller of 40 mm in diameter having a surface coated with a hard chromium plating, and the above-mentioned ink-carrying roller 1 were disposed opposite to each other with a gap of $d_2=2$ mm at an ink transfer position. The gel ink 2 of the present invention obtained above was charged in an ink-holding member 3a.

The ink-carrying roller 1 was rotated in the arrow A direction at about 15 rpm, and the ink-application roller 13 was rotated in the arrow G direction at about 10 rpm to form a layer 2a of the ink 2 on the ink-carrying roller 1.

Then, in contact with the layer 2a of the ink 2, the intermediate transfer roller 6a was rotated in the arrow B direction at about 15 rpm. In this instance, when a 1N-acetic acid aqueous solution was patternwise supplied from a pH modifier-supplying means 55 which was disposed opposite to the ink-carrying roller 1 at a pH change position to the ink layer 2a, corresponding to an image signal in the same manner as in Example 1. As a result, the ink 2 was selectively transferred to the intermediate transfer roller 6a to form an ink pattern 21 thereon.

On the other hand, in a portion to which the 1N-acetic acid aqueous solution was not supplied, a very slight amount of water was transferred to the intermediate transfer roller 6a, but the ink 2 was not substantially transferred to the intermediate transfer roller 6a.

At the ink image transfer position, a platen roller 4a was disposed opposite to the intermediate transfer roller 6a with a recording medium 7 of plain paper disposed therebetween moving in the arrow E direction. Further the platen roller 4a was rotated in the arrow F direction at the same speed as the intermediate transfer roller 6a while exerting a slight pressure onto the recording medium 7. As a result, red colored dot images 22 corresponding to the above ink pattern 21 were formed on the recording medium 7.

Figure 8:
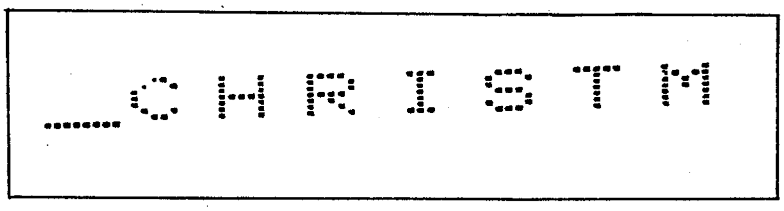
FIG. 8 shows a photomechanical reproduction of image samples obtained in Example 2.

In this case, when the pH value of the ink 2 was measured by means of a universal pH test paper (mfd. by Toyo Roshi K.K.), the image portion of the ink showed a pH value of 4, and the non-image portion thereof showed a pH value of 8. An example of the photomechanical reproduction (magnification: 1) of the thus obtained image is shown in FIG. 8.

EXAMPLE 3

| | |
|---|---|
| Ethylene glycol | 120 wt. parts |
| Water | 40 wt. parts |
| Gelatin (trade name: S2088, mfd. by Nippi Gelatin Kogyo K.K., isoelectric point: 4.9) | 40 wt. parts |
| Blue dye (trade name: Water Blue B105, mfd. by Orient Kagaku K.K.) | 6 wt. parts |
| Sodium chloride | 1 wt. part |
| Butyl para-hydroxybenzoate (antiseptic) | 1 wt. part |

The above ingredients were mixed under heating at 70° C., and then 1/10-N sodium hydroxide was added thereto whereby the pH value of the resultant mixture (ink) was 6.5. The ink was converted into a sol state under heating, and then formed into an ink roll which comprises a stainless steel roller (i.e., a core) having a diameter of 20 mm and a surface roughness of IS, and a layer of the ink disposed thereon, by means of a mold. The resultant product was then cooled to obtain an ink roll having an ink layer which had a thickness of 1 mm and was solid at room temperature (25° C.).

A portion of the ink obtained above was used as a sample and on the surface of the sample ink, an aluminum foil of 5 cm×5 cm in size was placed gently and was left standing as it was for 1 min in an environment of a temperature of 25° C. and a moisture of 60%. Then, the aluminum foil was gently peeled off from the surface of the ink and then quickly weighed accurately to measure the increase in weight of the aluminum foil. As a result, the increase in weight of the aluminum foil was substantially none (i.e., below 0.1 g).

Then, image recording was effected by using the above-obtained ink roll by means of an apparatus as shown in FIG. 6.

referring to FIG. 6, an ink roll 12 comprising a 20 mm-dia. core 1a with a surface roughness of IS and a 1 mm-thick layer of the ink 2 disposed thereon, and an intermediate transfer roller 6a comprising an iron cylindrical roller of 20 mm in diameter having a surface coated with a hard chromium plating were disposed opposite to each other at an ink transfer position with a gap which was the same as the thickness of the ink layer.

The ink roll 12 was rotated in the arrow A direction at about 10 rpm, and in contact with the ink layer, the intermediate transfer roller 6a was rotated in the arrow B direction at about 10 rpm. In this instance, when a 0.5N-aqueous sodium hydroxide solution was patternwise supplied from a pH modifier-supplying means 55 which was disposed opposite to the ink roll 12 at a pH change position to the surface of the ink roll 12, corresponding to an image signal in the same manner as in Example 1. As a result, the ink 2 was selectively transferred to the intermediate transfer roller 6a to form an ink pattern 21 thereon. The pH value of the ink constituting the ink pattern 21 was 9.2.

On the other hand, in a portion to which the 0.5N-sodium hydroxide aqueous solution was not supplied, a very slight amount of liquid was transferred to the intermediate transfer roller 6a, but the ink 2 was not substantially transferred to the intermediate transfer roller 6a.

At the ink image transfer position, a platen roller 4a of a 12 mm-dia. iron cylindrical roller surfaced with 4 mm-thick silicone rubber layer was disposed opposite to the intermediate transfer roller 6a with a recording medium 7 of plain paper disposed therebetween moving in the arrow E direction. Further the platen roller 4a was rotated in the arrow F direction at the same speed as the intermediate transfer roller 6a while exerting a slight pressure onto the recording medium 7. As a result, blue colored dot images each of 100 μm×150 μm in size were formed on the recording medium 7.

Incidentally, a slight amount of the ink remaining on the intermediate transfer roller 6a downstream of the ink image transfer position was removed by means of a cleaner 11 having a blade 10 of urethane rubber.

EXAMPLE 4

| | |
|---|---|
| Water | 100 wt. parts |
| Gelatin<br>(trade name: S2088, mfd. by Nippi Gelatin Kogyo K.K., isoelectric point: 4.9) | 20 wt. parts |
| Blue dye<br>(trade name: Water Blue B105, mfd. by Orient Kagaku K.K.) | 3 wt. parts |

The above ingredients were mixed under heating at 70° C., and then triethanolamine was added thereto whereby the pH value of the resultant mixture (ink) was 6.3, which was cooled at room temperature to obtain a gel ink.

A portion of the ink obtained above was used as a sample and was subjected to an adhesion test using an aluminum foil in the same manner as in Example 3. As a result, the increase in weight of the aluminum foil was substantially none (i.e., below 0.1 g).

Then, the above adhesion test was conducted in the safe manner as described above except that the surface of an aluminum foil of 5 cm×5 cm in size was supplied with 1 g of a 1N-sodium hydroxide solution and caused to contact the sample ink surface. As a result, 1.3 g of the ink was attached to the aluminum foil. This ink showed a pH value of 9.5.

EXAMPLE 5

| | |
|---|---|
| Water | 100 wt. parts |
| Polyvinyl alcohol<br>(Gohsenol KP08, mfd. by Nihon Gosei Kagaku K.K.) | 10 wt. parts |
| Carbon black<br>(Stering R, mfd. by Cabot Co., U.S.A.) | 3 wt. parts |
| Sodium borate<br>($Na_2B_4O_7.10H_2O$) | 0.015 wt. parts |

The above ingredients were mixed under heating at 80° C., and then 1/10-N sodium hydroxide was added thereto whereby the pH value of the resultant mixture (ink) was 8, and was cooled at room temperature to obtain an ink in the form of a gel. In the thus obtained gel ink, it was assumed that —OH groups of the polyvinyl alcohol were crosslinked with borate ions.

A portion of the ink obtained above was used as a sample and on the surface of the sample ink, an aluminum foil of 5 cm×5 cm in size was placed gently and was left standing as it was for 1 min in an environment of a temperature of 25° C. and a moisture of 60° C. Then, the aluminum foil was gently peeled off from the surface of the ink and then quickly weighed accurately to measure the increase in weight of the aluminum foil. As a result, the increase in weight of the aluminum foil was substantially none (i.e., below 0.1 g).

Further, another portion of the ink obtained above was used as a sample, supplied with 1N-HCl to adjust its pH to 4, and then was subjected to an adhesion test using an aluminum foil in the same manner as described above. As a result, 1.2 g of the ink was attached to the aluminum foil.

Then, by using the ink obtained above, image recording was effected by means of an apparatus as shown in FIG. 2 in the same manner as in Example 1, except that a 1N-aqueous HCl solution was used as a pH modifier.

As a result, the ink 2 was selectively transferred to the intermediate transfer roller 6a and to form thereon an ink pattern 21 corresponding to an image signal. Further, black colored dot images each of 100 μm×150 μm in size corresponding to the ink pattern 21 were formed on the recording medium 7.

What is claimed is:

1. An image recording method, comprising:

providing an ink which is substantially non-adhesive and capable of being imparted with an adhesiveness when subjected to a pH change;

causing a pattern of pH change corresponding to a given image signal on a layer of said ink formed on an ink-carrying member to form an adhesive pattern of the ink corresponding to the image signal; and transferring the adhesive pattern of the ink to a transfer-receiving medium to form thereon an ink pattern corresponding to the adhesive pattern.

2. A method according to claim 1, wherein said ink comprises a fluid ink capable of forming a fluid layer, and the ink is formed into a layer on the ink-carrying member and then said pattern of pH change is caused on the ink layer.

3. A method according to claim 1, wherein said pattern of pH change is caused by supplying a liquid to the ink layer formed on the ink-carrying member.

4. A method according to claim 3, wherein said liquid is an electron acceptor.

5. A method according to claim 3, wherein said liquid is an electron donor.

6. A method according to claim 1, wherein said transfer-receiving medium comprises an intermediate transfer medium, and the ink pattern formed on the intermediate transfer medium is then transferred to a recording medium.

7. A method according to claim 6, wherein said ink comprises a fluid ink capable of forming a fluid layer, and the ink is formed into a layer on the ink-carrying member and then said pattern of pH change is caused on the ink layer.

8. A method according to claim 6, wherein said pattern of pH change is caused by supplying a liquid to the ink layer formed on the ink-carrying member.

9. A method according to claim 8, wherein said liquid is an electron acceptor.

10. A method according to claim 8, wherein said liquid is an electron donor.

11. A method according to claim 3 or 6, wherein said electron acceptor or electron donor comprises an acidic or alkaline liquid, and the acidic or alkaline liquid is patternwise supplied to the ink layer by jetting it from a nozzle.

12. A method according to claim 1, wherein said ink comprises an ink not having a fluidity, and said pattern of pH change is caused on the surface of an ink roll which has preliminarily been formed by disposing a layer of said ink on the ink-carrying member.

13. An image recording apparatus, comprising:

an ink-carrying member moved along an ink contact position for carrying thereon a layer of an ink which is substantially non-adhesive but capable of being imparted with an adhesiveness when subjected to a pH change;

a transfer-receiving medium moved along the ink contact position so as to contact the ink layer formed on the ink-carrying member at the ink contact position; and means for supplying a pH modifier to the ink layer to cause a pattern of pH change on the ink layer;

whereby a part of the ink on the ink-carrying member imparted with an adhesiveness corresponding to the pattern of the pH change is selectively transferred to the transfer-receiving medium.

14. An apparatus according to claim 13, wherein said pH modifier-supplying means comprises a device which includes a nozzle and a heat-generating element disposed therein, and is capable of bubbling a pH modifier disposed in the nozzle due to the heat generated by the heat-generating element corresponding to a given image-signal to supply the pH modifier from the nozzle to the ink layer.

15. An apparatus according to claim 13, wherein said transfer-receiving medium constitutes an intermediate transfer medium so that the ink pattern formed thereon is further transferred to a recording medium disposed opposite to the intermediate transfer medium at an ink image transfer position downstream from the ink contact position.

16. An apparatus according to claim 15, wherein said pH modifier-supplying means comprises a device which includes a nozzle and a heat-generating element disposed therein, and is capable of bubbling a pH modifier disposed in the nozzle due to heat generated by the heat-generating element corresponding to a given image-signal to supply the pH modifier from the nozzle to the ink layer.

* * * * *